United States Patent Office 3,271,314
Patented Sept. 6, 1966

3,271,314
2,6-DIISOPROPYLPHENOL
George G. Ecke, Penn Hills Township, and Alfred J. Kolka, Pittsburgh, Pa., assignors to Ethyl Corporation, New York, N.Y., a corporation of Virginia
No Drawing. Filed Dec. 4, 1958, Ser. No. 778,063
2 Claims. (Cl. 252—52)

This application is a continuation-in-part of our prior co-pending application, Serial No. 622,831, filed November 19, 1956, now abandoned, which, in turn, is a continuation-in-part of our prior application Serial No. 526,556, filed April 29, 1954, now U.S. Patent No. 2,831,898.

This invention relates to new compositions of matter and in particular to 2,6-diisopropylphenol as a new compound and the use of this compound as an antioxidant and as a chemical intermediate.

An object of this invention is to provide novel compositions of matter. Another object of this invention is to provide the compound 2,6-diisopropylphenol. A further object of this invention is to provide organic material stabilized against oxidative deterioration by 2,6-diisopropylphenol. Still another object of this invention is to provide certain novel and useful di(2,6-diisopropylphenyl)monohalophosphates.

2,6-diisopropylphenol having the formula

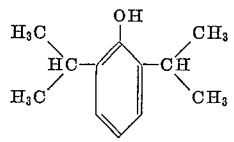

has the following physical properties:

Molecular weight _____ 178.3.
Freezing point _____ 17.9° C. (64° F.).
Boiling point _____ 242.4° C. (468° F.)
Density, $d_4^{20}$ _____ 0.955.
Refractive index, $n_D^{20}$ _____ 1.5461.
Flash point (Cleveland open cup) _ 118° C. (245° F.).
Solubility _____ Insoluble in water; completely miscible with most organic solvents.

This compound has a number of important uses such as possessing biocidal properties, being useful in retarding gum formation in gasoline and being useful in the preparation of valuable compounds of a type which is difficult to prepare by other means.

Our new compound can be conveniently prepared by reaction of phenol with propylene in the presence of an aluminum phenoxide as catalyst. In this preparation high yields of our valuable new compound are obtained. In this preparation the phenol is reacted with propylene in the presence of about 0.1 to 30 percent by weight of the aluminum phenoxide catalyst. Aluminum phenoxide itself is the preferred catalyst but substituted aluminum phenoxides can also be used. This alkylation is generally conducted at temperatures ranging from 0 to about 500° C. and at pressures of from less than one atmosphere to about 3000 atmospheres or higher. The reactants may be caused to react either with or without the presence of a diluent. When a diluent is used it is conveniently one which is inert to the components under the conditions of the reaction. Paraffins, cycloparaffins and aromatic hydrocarbons are examples of suitable diluent types.

The following example illustrates preparation of our new compound.

*Example 1*

Aluminum phenoxide was prepared in an autoclave by heating 1336.2 parts of phenol, 12.9 parts of aluminum turnings and 87 parts of anhydrous toluene to 200° C. A reaction occurred after the heat supply to the autoclave was discontinued and the autoclave had cooled to 194° C. At this point the pressure rose from 4 to 160 p.s.i.g. and the temperature to 207° C. over a period of three minutes. After this pressure and temperature rise, the reaction was maintained at approximately 170° C. for one hour. The contents of the autoclave were cooled to room temperature, the hydrogen was vented, and the autoclave contents were reheated to 170° C. The autoclave was pressurized slowly with propylene up to a maximum of 500 p.s.i.g. The run was continued for 17 hours at 170° C. and 450–500 p.s.i.g. during which time 658 parts of propylene was charged to the autoclave and a total pressure drop of 1170 p.s.i. was observed. The run was then continued for another 8.5 hours at 170° C. and 450–500 p.s.i.g. Four hundred and sixty-four parts of propylene was added and an additional 335 p.s.i. pressure drop was realized. Heating was continued for an additional 5 hour reaction time at 170° C. and 450–500 p.s.i.g. In this phase of the reaction, 127 parts of propylene was charged to the autoclave and a 145 p.s.i. pressure drop was observed. The product mixture was removed from the autoclave and hydrolyzed with water, and the filtrates azeotroped to dryness using toluene and fractionally distilled at atomspheric pressure. After a reaction time of 30.5 hours a 44.6 percent yield of 2,6-diisopropylphenol was obtained.

One of the outstanding unique properties of our new compound is its ability to react with phosphorus trihalides and phosphorus oxyhalides such as phosphorus oxytrichloride to produce di(2,6-diisopropylphenyl)monohalophosphites as phosphates. These compounds, which are valuable in their own right as pesticides, and which are also valuable as intermediates for preparation of mixed phosphorus esters which find utility as fuel additives cannot be conveniently prepared with other phenols. Thus, the reaction hitherto has always tended to give completely esterified phosphates (triaryl phosphates) or to give products in which only one of the halogens in the phosphorus oxyhalide compounds has been replaced by an aryl group. Usually with other phenols a more or less random mixture of all possible products is obtained. We have found surprisingly that with our unique compound a high yield of the diarylated product is formed with minimum contamination by other products.

Thus an embodiment of the present invention is a process which comprises reacting 2,6-diisopropylphenol with a compound having the formula $P(A)_nX_3$ where A represents sulfur or oxygen, $n$ is 1 or 0, and X represents a halogen such as fluorine, chlorine, bromine and iodine. Another embodiment of this invention is the novel di-(2,6-diisopropylphenyl)monohalophosphate or thiophosphate which results from the reaction.

The reaction between 2,6-diisopropylphenol and a phosphorus trihalide compound may be conducted in the presence of a Friedel-Crafts catalyst. A Friedel-Crafts catalyst is a Lewis acid which can also be defined as a salt having strong electrophilic characteristics. It can be any halide of a metal of Groups IIA, IIB, IIIA, IVB, VB, VIB, VIIB and VIII of the Periodic Table. The halide of Groups IIB, IIIA, IVB and VIII are preferred. Illustrative examples of preferred metal halides are zinc difluoride, boron trifluoride, boron trichloride, boron tribromide, boron triiodide, aluminum trichloride, aluminum trifluoride, titanium tetrachloride, titanium tetrabromide, ferric chloride and the like. Other examples of suitable Friedel-Crafts catalysts of generally lesser activity are gallium, indium, thallium, beryllium, magnesium, zirconium, vanadium, chromium and manganese halides.

The aluminum halides, particularly aluminum chloride, are the preferred Friedel-Crafts catalyst.

The reaction also proceeds in the absence of a catalyst. The reaction between the phosphorus compound and 2,6-diisopropylphenol is conveniently carried out at temperatures from 50° to 250°. A preferred temperature range is from 75° to 150° as it is found that higher yields of the desired product are obtained in this latter temperature range. A preferred method for carrying out the reaction constitutes mixing the phosphorus compound and Friedel-Crafts catalyst in an appropriate reaction vessel and slowly adding the 2,6-diisopropylphenol thereto while maintaining the temperature at the desired point. Reaction time of from 1 to 10 hours may be employed; however, it is preferred to introduce the 2,6-diisopropylphenol slowly into the reaction mixture at temperatures up to about 100° C. over a time period ranging from 1 to 3 hours and then to raise the temperature of the reaction mixture to from 100 to 220° C. for from 1 to 10 hours. Alternatively the phosphorus compound may be added to the 2,6-diisopropylphenol. The desired product may be separated from the reaction mixture by first distilling the mixture at reduced pressure to remove all volatile material and then diluting the residue from this distillation with an organic solvent. The solvent containing the product may then be washed with dilute base and then with water, dried and stripped of the organic solvent. Further purification of the product may be effected if desired.

The following examples illustrate this process and the products obtained:

*Example II*

To a mixture of 92 parts of phosphorus oxychloride and 2.67 parts of anhydrous aluminum chloride maintained at a temperature of 90° C. was added 348 parts of 2,6-diisopropylphenol over a period of 2.5 hours with mechanical agitation. Agitation was continued while the temperature of the mixture was gradually raised to 220° C. over a period of 8 hours. At the end of this time the mixture was distilled at 100° C. at pressures of 0.5–20 millimeters to remove unreacted 2,6-diisopropylphenol. The crude amber viscous liquid obtained as a residue from this stripping was diluted with ether and washed with two portions of aqueous 10 percent sodium carbonate solution and then with successive portions of water until the pH of the water washings was 7. The organic layer was then dried for several hours under sodium sulfate. After this the ether was removed by distillation and the residue was dissolved in n-hexane and washed and dried again. The washing and drying procedure was repeated a third time and then the solution of product in n-hexane was stripped at 100° C. and 0.01 millimeter pressure to remove volatile material. The residual product, di(2,6-diisopropylphenyl)monochlorophosphate which was obtained in 88 percent yield (229.5 parts), gave a phosphorus content of 7.12 percent on analysis. This corresponds to a calculated percentage of 7.09 percent for di-(2,6-diisopropylphenyl)monochlorophosphate having the empirical formula $C_{14}H_{34}O_3PCl$.

*Example III*

Phosphorus tribromide is reacted in the absence of a catalyst with 2,6-diisopropylphenol. The phosphorus compound is added to the phenol which is maintained at 100° C. during the addition. One mole of the phosphorus compound is employed to two moles of the phenol. After the addition is complete, the temperature is raised to 150° C. and maintained for two hours. A high yield of di(2,6-diisopropylphenyl)monobromophosphite results.

*Example IV*

Phosphorus thiotrichloride is reacted with two moles of 2,6-diisopropylphenol using magnesium chloride as a catalyst according to the procedure of Example I. An excellent yield of di(2,6-diisopropylphenyl)monochlorothiophosphate results.

Excellent results are also obtained when 2,6-diisopropylphenol is reacted with other phosphorus trihalides such as $POBr_3$, $PSBr_3$, $PCl_3$ and similar phosphorus compounds.

Thus, our product has the unique property of reacting with phosphorus halides, oxyhalides and thiohalides to form as clean-cut products di(2,6-diisopropylphenyl) monohalophosphates or phosphites in high yield. With other phenols unsatisfactory results are obtained in this reaction as is stated above. Thus, by providing our new phenol we are also making is possible to obtain these valuable phosphorus compounds in simple direct one-step syntheses.

The compound of this invention has also been found to be an excellent antioxidant. Therefore, an embodiment of this invention is a new composition of matter which comprises organic material normally tending to undergo oxidative deterioration in the presence of oxygen-containing gases, i.e., air, oxygen or ozone, containing a small antioxidant quantity, up to 5 percent, of 2,6-diisopropylphenol. 2,6-diisopropylphenol finds important utility as an antioxidant in a wide variety of oxygen sensitive materials. Thus, liquid hydrocarbon fuels such as gasoline, kerosene and fuel oil have greatly enhanced storage stability when treated with small quantities of 2,6-diisopropylphenol. In addition, lubricating oils and functional fluids, both those derived from natural occurring hydrocarbons and those synthetically prepared were greatly enhanced by the practice of this invention. The addition of a small quantity of 2,6-diisopropylphenol to such materials as turbine, hydraulic, transformer and other highly refined industrial oils; waxes; soaps and greases; plastics; synthetic polymers such as polyethylene and propylene; elastomers, including natural rubber; crankcase lubricating oils; lubricating greases and the like, greatly increases the resistance to deterioration in the presence of air, oxygen or ozone. 2,6-diisopropylphenol is also very useful in protecting petroleum wax—paraffin wax and micro-crystalline wax—against oxidative deterioration. The compound also finds use in the stabilization of edible material including fats and oils of animal or vegetable origin which tend to become rancid due to oxidative deterioration during periods of storage. Typical representatives of these edible fats and oils are linseed oil, cod liver oil, castor oil, rapeseed oil, coconut oil, olive oil, palm oil, corn oil, sesame oil, peanut oil, babassu oil, butter, fat, lard, beef tallow and the like. 2,6-diisopropylphenol is also effective as an antioxidant for high molecular weight unsaturated hydrocarbon polymers such as polybutadiene, methyl rubber, polybutene rubber, natural rubber, butyl rubber, GR–S rubber, GR–N rubber, dimethyl butadiene rubber and similar polymers.

A particularly important utility of our compound is in retarding formation of gum in unstable gasoline. In connection with this use it is to be noted that the unexpected fact that our phenol is liquid (freezing point 17.9° C.) whereas other superficially closely related phenols are solids (2,6-diethylphenol, melting point 37–38° C. and 2,6-di-tert-butylphenol, melting point 37° C.) is of great benefit and extreme importance as it permits use of convenient blending procedures for adding our compound to the gasoline to be retarded, and also in such blended gasolines insures that gasolines containing our additive will be readily and cleanly inducted into the combustion chambers of the engine without deposition in the manifold such as is likely to occur with gasolines having additives which are solids.

The following examples illustrate the organic material benefited by the practice of this insertion.

*Example V*

The gum retarding tendencies of 2,6-diisopropylphenol are shown by the following data: Two samples of gasoline were stored at 110° F. for a period of 18 weeks. One of these gasolines did not contain our phenol and the other one did at a concentration corresponding to 5 pounds per 1000 barrels of gasoline. The initial ASTM gum of the untreated gasoline in milligrams/100 milliliters was 3.0. After 6 weeks this figure was 6.9; after 12 weeks it was 15.4 and after 18 weeks it was 26.6. In contrast, in the gasoline containing our new phenol the corresponding figures are 3.8, 3.7, 4.8 and 10.0. In a sample of gasoline containing our new compound in concentration corresponding to 15 pounds per 1000 barrels of gasoline the corresponding figures were 2.0, 3.6, 3.9 and 5.6.

*Example VI*

2,6-diisopropylphenol was dissolved in pure white refined mineral oil to the extent that $1.2 \times 10^{-2}$ moles per liter of the phenol was present in the mineral oil. Ferric hexoate was also added to the mineral oil. The concentration of the iron salt was adjusted to 0.05 percent based on $Fe_2O_3$. One milliliter of the resulting composition was charged to an apparatus for measuring the oxidative stability of the mineral oil. The apparatus consists of a glass vessel having a 12 milliliter capacity and an inlet tube which can be connected to a mercury manometer. The vessel is flushed with oxygen at atmospheric pressure and then connected to the mercury manometer. It is then immersed in a constant temperature bath at 150° C. whereupon the oxygen pressure rise is indicated on the manometer. The manometer is observed until a rapid pressure drop in the vessel occurs. The time from immersion to initiation of the pressure drop is referred to as the induction period of the mineral oil. When mineral oil containing the iron hexoate is subjected to this oxidative test, a pressure drop in the manometer is observed in from 2 to 3 minutes, showing that the mineral oil is unstable to oxidative deterioration at 150° C. However, when the composition containing $1.0 \times 10^{-2}$ per liter of 2,6-diisopropylphenol is tested in this fashion, no pressure drop is observed in the manometer until after 77 minutes. Thus, the mineral oil has been greatly improved against oxidative deterioration by the presence of this small amount of 2,6-diisopropylphenol.

*Example VII*

To 2814 parts of a commercial gasoline having a gravity of 59.0° API, an initial boiling point of 98° F. and a final boiling point of 390° F. and which contains 45.2 volume percent paraffins, 28.4 volume percent olefins and 25.4 volume percent aromatics is added 120 parts of 2,6-diisopropylphenol and the mixture is thoroughly blended until the additive is completely dissolved.

*Example VIII*

Sixty parts of 2,6-diisopropylphenol is added with stirring to 2856 parts of a gasoline having an initial boiling point of 93° F. and a final boiling point of 378° F., and which contains 35.3 volume percent paraffins, 34.2 volume percent olefins and 30.5 volume percent aromatics. This gasoline has a gravity of 56.2° API.

*Example IX*

To 2924 parts of a liquid hydrocarbon fuel containing 49.9 volume percent paraffins, 15.9 volume percent olefins and 34.2 volume percent aromatics, and which has an API gravity of 51.5°, an initial boiling point of 111° F. and a final boiling point of 394° F. is added 20 parts of 2,6-diisopropylphenol.

*Example X*

To 1000 parts of gasoline having 44.0 percent paraffins, 17.9 percent olefins and 38.1 percent aromatics, an initial evaporation temperature of 94° F. and a final evaporation temperature of 119° F. is added 10 parts of 2,6-diisopropylphenol. The mixture is agitated to dissolve the mixture. The resulting fuel has an excellent stability to oxidative deterioration.

*Example XI*

To 1000 parts of commercially available diesel fuel having an octane number of 51.7 and a 50 percent evaporation temperature of 509° F. is added 3 parts of 2,6-diisopropylphenol. The resulting fuel is stable to oxidative deterioration.

*Example XII*

With 1000 parts of melted lard is mixed 1 part (0.1 percent) of 2,6-diisopropylphenol. After cooling, the lard can be stored for long periods of time without the development of rancidity.

*Example XIII*

To 5000 parts of olive oil is added 1 part of 2,6-diisopropylphenol and the mixture is agitated to produce a homogeneous blend which is stable to oxidative deterioration for a long period.

*Example XIV*

To an additive-free solvent-refined crankcase lubricating oil having a viscosity index of 95 and a SAE viscosity of 10 is added 0.001 percent of 2,6-diisopropylphenol.

*Example XV*

To 1000 parts of a solvent refined neutral oil (95 VI and 200 SUS at 100° F.) containing 6 percent of a commercial methacrylate-type VI approver which gives the finished formulation a VI of 140 and a viscosity of 300 SUS at 100° F. is added 5 percent 2,6-diisopropylphenol.

*Example XVI*

To 100,000 parts of dioctyl sebacate having a viscosity of 210° F. of 36.7 SUS, a viscosity index of 159 and a molecular weight of 426.7 is added 250 parts (0.25 percent) of 2,6-diisopropylphenol.

*Example XVII*

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 2,6-diisopropylphenol | 1 |
| Benzothiazyl disulfide | 0.4 |
| Amine activator | 0.5 |

This stock is then vulcanized for 60 minutes at 280° F.

*Example XVIII*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 2,6-diisopropylphenol. Polyethylene of improved oxidative stability results.

*Example XIX*

A linear polyethylene having a high degree of crystallinity (up to 93 percent) and below 1 ethyl branched chains per hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 2,6-diisopropylphenol and the resulting product has improved stability characteristics.

The 2,6-diisopropylphenol of this invention can be employed as an antioxidant in concentrations from about 0.001 percent to about 5 percent by weight of the final product. However, for most purposes, from 0.01 percent to about 2.0 percent is usually sufficient to prepare a product of satisfactory oxidative stability.

Our new compound has still other important utilities. Among these may be mentioned its usefulness as a biocide, particularly as a germicide and a wormicide. Thus, for example, it is effective in vitro against *Ascoris lumbricoides suum* wherein it achieved 100 percent kill in two hours as a 1:1000 emulsion in 2 percent ethanol.

We claim:

1. Gasoline normally tending to undergo oxidative deterioration containing a small antioxidant quantity, up to 5 percent, of 2,6-diisopropylphenol.

2. A lubricating oil normally tending to undergo oxidative deterioration containing a small antioxidant quantity, up to 5 percent, of 2,6-diisopropylphenol.

References Cited by the Examiner

UNITED STATES PATENTS

| | | | |
|---|---|---|---|
| 2,147,256 | 2/1939 | Ipatieff et al. | |
| 2,202,877 | 6/1940 | Stevens et al. | 44—78 |
| 2,248,831 | 7/1941 | Stillson et al. | 260—619 |
| 2,285,473 | 6/1942 | Thomas et al. | 260—626 |
| 2,286,953 | 6/1942 | Carpenter | 260—626 |
| 2,459,597 | 1/1949 | Stillson et al. | |
| 2,476,833 | 7/1949 | Albert. | |
| 2,479,948 | 8/1949 | Luten et al. | 44—78 |
| 2,581,907 | 1/1952 | Smith et al. | |
| 2,631,156 | 3/1953 | Mattil | 260—398.5 |
| 2,680,122 | 6/1954 | Black et al. | 260—398.5 |
| 2,790,010 | 4/1957 | Shepard | 260—626 |
| 2,793,239 | 5/1957 | Toland | 260—626 |
| 2,831,898 | 4/1958 | Ecke et al. | 260—626 |
| 2,872,473 | 2/1959 | Tolkmith | 260—461 |
| 2,879,283 | 3/1959 | Gaertner et al. | 260—461 |

OTHER REFERENCES

Ind. and Eng. Chem., vol. 45, No. 1, January 1953, pp. 197 to 200.

DANIEL E. WYMAN, *Primary Examiner.*

ABRAHAM H. WINKELSTEIN, *Examiner.*

R. S. AULL, C. O. THOMAS, J. E. DEMPSEY,
*Assistant Examiners.*